Patented May 12, 1942

2,282,800

UNITED STATES PATENT OFFICE 2,282,800

STABILIZATION AGAINST OXIDATION BY USE OF CARAMELIZED MILK SOLIDS

Sidney Musher, New York, N. Y., assignor to Musher Foundation Incorporated, New York, N. Y., a corporation of New York No Drawing. Application April 23, 1940,
Serial No. 331,181

8 Claims. (Cl. 99—163)

The present invention relates to improved methods for manufacturing butter and particularly relates to producing butter of improved keeping quality by special treatment of the cream before churning into butter.

The cream that is utilized in the manufacture of butter normally contains between about 25% and 35% butterfat and about 6% of milk-solids-not-fat, consisting primarily of milk protein such as casein, milk sugar such as lactose, and mineral matter present in minor proportions.

In accordance with the present invention, milk-solids-not-fat and particularly whey is processed at a sufficiently high temperature as to caramelize the milk solids. These caramelized milk solids are then added to cream before churning, whereby the butter churned from that cream and which butter is substantially free of the added caramelized milk solids is substantially stabilized against oxidative deterioration.

The whey that is particularly utilized in accordance with the present invention is obtained from the manufacture of cheese and is the material drawn off after the milk has been curdled with rennet, for example, and after the curd has formed the proper degree of hardness. Of particular importance for use is the whey that is obtained from the manufacture of cottage cheese, whereby coagulation is effected by natural souring and the liquid has been heated nearly to boiling. The whey may further be treated in order to remove a portion of the lactose, the lactose being allowed to crystallize out.

The whey is substantially free of casein and of fat and will contain about 70% to 75% of lactose and 10% to 15% protein, the protein being substantially free of casein and being present in the form of milk albumin.

Where a portion of the lactose has been allowed to crystallize out, the whey will contain about 35% to 45% protein in the form of albumin and about 40% to 55% of lactose with approximately 13% to 17% total ash, based upon the solids weight of the whey.

The whey, preferably in concentrated or condensed form and containing over about 20% to 25% total solids is then subjected to a temperature of at least 200° F. for a period of about 30 minutes or more and preferably to between 235° F. to 245° F. for from 20 minutes to 40 minutes or more in order to caramelize the whey.

Apparently, in the production of the caramelized whey, antioxygenic action is materially enhanced. Unless the whey has been subjected to this caramelization step, the most desirable results of the present invention are not secured.

The whey in substantially unconcentrated form may also be caramelized but, in any event, following caramelization, the whey is condensed or concentrated to at least about 20% to 25% total solids and the caramelized whey may further be dehydrated to complete dryness.

The caramelization of the whey preferably takes place after acidifying the whey to a pH of between about 4 and 6.8 and preferably to a pH of 5.5 to 6.

For example, whey may be acidified to a pH of 5.5 to 6 by the addition of citric acid, tartaric acid, hydrochloric acid or other organic or inorganic acid. The whey may then be concentrated, preferably by boiling at atmospheric pressure, to a total solids content of about 25%.

The slightly acidified whey may then be caramelized by heating to 250° F. for 30 minutes to 1 hour and the caramelized whey where desired may be further dehydrated or concentrated.

Where desired, following caramelization, the pH may be readjusted to not over about 6.6 by the addition of an alkaline substance, such as bicarbonate of soda, and the adjusted caramelized whey may then be dried or further concentrated or condensed and ready for use in accordance with the present invention.

Where the caramelized whey is added to cream containing its normal proportion of butterfat and milk-solids-not-fat, the addition of the whey being made to the cream preferably before the cream is heated to about 170° F. for 1 minute or more, and where the cream is then churned to form butter, the resultant butter removed from the cream is substantially stabilized against oxidative deterioration.

At the same time, the butter consisting of the coalesced butterfat globules is substantially free of the added caramelized whey.

Although caramelized whey is emphasized as of particular importance for use in accordance with the present invention, other forms of milk-solids-not-fat may also be employed. For example, caramelized buttermilk and particularly where at least a portion of the lactose has been converted to lactic acid may similarly be employed.

There may also be utilized such other forms of milk-solids-not-fat as evaporated or condensed caramelized buttermilk containing about 27% total solids, semi-solid caramelized buttermilk containing about 40% total solids, caramelized dried buttermilk, caramelized skim milk, caramelized whole milk and caramelized whey residue.

For example, skim milk containing its normal 9% total milk solids content or after partial evaporation to a total solids content of about 20% to 25%, may be caramelized by heating to over 220° F. and preferably to about 235° F. to 250° F. for a period of about 20 to 30 minutes. The resultant caramelized product which will contain over 20% to 25% total solids content may be added to cream in the manufacture of butter where it will show enhanced stabilizing activity.

The caramelized milk-solids-not-fat when used for addition to cream in the manufacture of butter will contain over 20% total solids and preferably as much as 40% or more total solids. Following caramelization, the milk solids, such as the caramelized whey, may be subjected to further concentration or dehydration. For example, the caramelized whey may be dried by exposure on a heated drum until its moisture content is reduced below about 20%, or may be subjected to a blast of heated air, although drum drying is preferred.

In order to develop the enhanced stabilizing action of the milk solids, the heat caramelizing treatment must be conducted while the milk solids such as the whey, are in substantially aqueous condition. Where, for example, dried skim milk is heated to 250° F. for 30 minutes, the enhanced stabilizing action is not obtained, whereas when the skim milk in aqueous dispersion is heated to the same temperature, the enhanced stabilizing effect is developed.

The concentrated, condensed or dried whey which has been previously caramelized in aqueous condition is added to dairy cream containing between 25% and 35% total butterfat and the cream then churned to produce highly stabilized butter resistant to the development of oxidized, tallowy and metallic flavors.

It is particularly desirable for the caramelized milk solids to be added to the cream before the cream is subjected to a further heat treatment of over 145° F. and preferably to 170° F. to 180° F.

By the addition of the caramelized milk solids in accordance with the present invention, the concentration of total milk solids with respect to the milk solids originally present in the cream is definitely increased.

Desirably, these milk-solids-not-fat are added to the cream in an amount of between about 0.5% and 15% against the butterfat weight of the cream.

EXAMPLE I

To cream containing 30% butterfat and its normal complement of milk-solids-not-fat, was added 3 p. p. m. of CuSO₄ and the cream divided into two lots as follows:

Cream A

To this cream was added 4% (against the butterfat weight of the cream) of powdered whey prepared by drying whey under reduced pressure and at a temperature not exceeding 170° F.

Cream B

To this cream was added 4% (against the butterfat weight of the cream) of powdered whey which had been prepared by heating partially concentrated whey containing 30% total solids to 240° F. for 30 minutes and then drying.

Creams A and B were placed under refrigeration at 50° F. and tested for the development of tallowiness and oxidative deterioration at regular intervals with the following results.

[The number of plus signs indicate the degree of deterioration]

|  | Oxidized flavor after— | | |
| --- | --- | --- | --- |
|  | 24 hrs. | 48 hrs. | 72 hrs. |
| Cream A | − | ++ | +++ |
| Cream B | − | − | ± |

Samples of the above creams were also churned to produce butter and the butter scored for flavor. In each case the butter was held at 50° F. and examined at weekly intervals, the range of butter scores being between about 86 for inedible butter and 94 for butter having the finest flavor.

|  | Score after— | | |
| --- | --- | --- | --- |
|  | 1 week | 2 weeks | 3 wks. |
| Butter churned from cream A | 91.5 | 90 | 88.5 |
| Butter churned from cream B | 92 | 91 | 90 |

As may be observed from the above experiment, it is evident that both the cream as well as the butter churned from that cream is materially improved in keeping quality by the addition of the caramelized concentrated whey to the cream in the manufacture of butter.

These results are particularly surprising in view of the fact that the powdered caramelized whey is entirely removed from the butterfat during the churning operation and is carried out with the buttermilk, but nevertheless serves to stabilize the butter against oxidative deterioration.

Together with or in lieu of the milk-solids-not-fat that may be caramelized and employed in accordance with the present invention, the alcohol soluble extracts of skim milk, buttermilk and whey may also be utilized. There may also be employed mixtures of lactose and casein, mixtures of lactose and phosphatides such as milk phospholipins or lecithin, etc.

As a result of the addition of the caramelized milk solids, the total milk solids content of the cream is desirably increased to about 8% or 9% and at least 1% to 2% above and preferably 3% above the normal milk-solids-not-fat content.

Upon addition of the concentrated caramelized milk solids to the cream, it is particularly desirable for the combination to be subjected to homogenization or colloid mill treatment in order to thoroughly disperse the butterfat globules in the caramelized milk solids. The more intimate the contact of the fat globules with the caramelized milk solids, the greater is the enhanced stabilizing effect.

The concentrated caramelized whey or other milk-solids-not-fat before addition to an aqueous oxidizable product should contain at least about 20% to 25% total solids and should at least have twice the solids concentration of whole milk or skim milk.

The results obtained in accordance with the present invention are in direct contradistinction to the generally accepted fact that the availability and effectiveness of an antioxidant is dependent upon how thoroughly it is dispersed throughout the body of the fat or oil subject to oxidation.

On the other hand, in accordance with this invention, the caramelized whey is dispersed throughout the aqueous continuous phase to protect the discontinuous butterfat phase and is not dispersed through the discontinuous butterfat phase subject to oxidation.

In addition to utilizing the caramelized whey for addition to cream in the manufacture of butter, it may also be utilized for addition to cream where the cream is to be held in frozen storage for long periods of time to retard oxidative deterioration, tallowiness and metallic decomposition of the cream. For example, from 1% to 15% or more by weight of caramelized dehydrated whey may be added to and mixed in cream containing between 20% and 40% butterfat with its normal complement of milk-solids-not-fat and the cream then set aside in storage for a period of from 1 to 5 or 6 months.

When the cream is removed from storage, it will be found that it will be substantially stabilized against oxidative deterioration and its original score and fresh flavor will have been retained to a marked degree.

Moreover, the dehydrated caramelized whey or other similar milk solids may be utilized for addition to ordinary market milk, particularly where the milk has been copper contaminated, and when added to milk in an amount of between 0.1% and 3% against the total weight of the milk, marked stabilization against the development of oxidized flavors will be obtained. This is particularly important in connection with the treatment of low bacterial count milks and those high quality milks which are readily susceptible to oxidized and tallowy off-flavors.

The concentrated caramelized whey and other similar milk-solids-not-fat may also be employed as the aqueous continuous medium through which oxidizable vitamin preparations may be dispersed.

For example, the vitamin A present in cod liver oil, tuna fish liver oil, halibut liver oil, etc., may be stabilized against deterioration and loss by emulsifying the fish oil or its concentrated vitamins in the substantially aqueous caramelized whey.

For example, between 5% and 25% of fish oil, such as cod liver oil, or of any other fish, fish liver or similar oil containing vitamin A may be thoroughly admixed with substantially caramelized whey and the resultant product will retain its vitamin A content over long periods of time. For this purpose it is desirable to use whey having at least 25% total solids and not having more than 50% to 60% total solids so that the product is in substantially aqueous condition and so that the caramelized whey will occupy the continuous aqueous phase.

The caramelized whey or other milk-solids-not-fat may also be added to a carrier such as to salt, sugar, starch or ordinary uncaramelized dried skim milk or whey.

For example, in the final drying of salt and while the salt is at a temperature of about 250° F. to 275° F., there may be applied to the salt from 0.5% to 5% on its total solids weight basis of concentrated caramelized whey and the whey dried on the surface of the salt crystals.

Where the salt is maintained during drying at a sufficiently high temperature, over 225° F. to 250° F., the whey may be applied to the salt in substantially uncaramelized form and the caramelization will then proceed during the drying on the surface of the salt crystals.

The treated salt carrying the minor amount of caramelized milk solids may be utilized for addition to butter in the preparation of salted butter and where the salt is added direct to the churn.

It is also possible to add the caramelized concentrated whey direct to the butter in the churn although where the addition is made direct to the butter, the use of salt as a carrier for the caramelized milk solids is highly desirable and will result in an enhanced stabilizing effect on the keeping quality of the butter.

For example, where from 2% to 2½% of salt is added to the butter and where the salt carries from 0.5% to about 5% of its total solids content of caramelized dried milk solids, and preferably caramelized dried whey, the salt will improve the keeping quality of the butter and retard oxidized and tallowy off-flavors.

Furthermore, salt carrying a relatively small amount of caramelized dried milk solids may be utilized in the curing of meats, fish, leather and similar oxidizable organic compositions. The treated salt is of particular importance for use in retarding oxidation and fat rancidity of such products as bacon, herring, mackerel, salmon, sardine, and other fatty compositions.

For example, salt carrying 1% on its solid weight basis of caramelized dried whey may be used in place of ordinary untreated salt in the wet or dry curing of bacon. The salt may be rubbed on the bacon bellies in an amount of about 50% against the weight of the bacon. The bacon may then be cured for from 20 to 45 days and, at the close of the curing period, removed from the salt brine containing the caramelized whey and the bacon thus cured is substantially stabilized against oxidative deterioration.

The caramelized dehydrated whey or other caramelized milk solids may also be utilized for combination with sugar, preferably crystallized in an amount of between 0.5% and 10% against the weight of the sugar. The caramelized milk solids are preferably applied to cane or beet sugar at the centrifugals, so that each crystal of the sugar is contacted with the milk solids. Caramelized dry whey may also be prepared with dextrose or corn syrup by adding in the same small proportion of 0.5% to 10%.

The sugar thus prepared carrying the dehydrated caramelized milk-solids-not-fat may be utilized for addition to jams and jellies, marmalade, dairy products, etc. and will stabilize them against oxidative deterioration.

Dehydrated, caramelized whey or similar milk-solids-not-fat may be combined with starch in a minor proportion such as in an amount of between 0.5% and 10% against the weight of the starch. The starch composition may then be utilized for application particularly as a surface sizing on paper, paperboard and textiles to exert an antioxygenic effect.

For example, starch may be combined with 1% by weight of dried whey which had been caramelized at 250° F. for 30 minutes in aqueous concentrated condition before drying. The starch carrying the caramelized whey may then be utilized in an aqueous bath and either in boiled or unboiled condition for application as a surface sizing on paper, paperboard and textiles. The primary or secondary stock paperboards or sulfite, greaseproof or glassine paper may be sized with this treated starch and the papers and paperboards will exert an antioxygenic effect on products which are packaged in them.

In a similar manner, the starch carrying caramelized milk solids in a minor proportion may be utilized in the preparation of puddings and desserts.

Moreover, the caramelized whey or other caramelized milk-solids-not-fat may be added to the rendering kettle in the wet rendering of meat and fishery products such as for addition to the wet rendering kettle in the preparation of fish oils and fish meals and in the wet rendering of lard. For example, in the preparation of sardine oil and sardine meal, a relatively small amount, such as between about 1% and 20% of caramelized dehydrated whey against the solids weight basis of the fish may be added at the time the sardines are cooked in the aqueous medium and the sardine oil and sardine meal removed will be substantially stabilized against oxidative deterioration.

Where the whey becomes caramelized in the cooking kettle, no prior caramelization is required although it is preferable for the whey to have been caramelized at the highest possible temperature, such as at about 250° F. for 30 minutes and then added to the rendering kettle in order to produce the most highly desirable stabilizing effect.

It is also possible to include in the above combination or in the milk-solids-not-fat before or after caramelization, from 0.5% to 10% of lecithin or other phosphatide, polycarboxylic aliphatic acid such as citric acid, tartaric acid, succinic acid or saccharic acid.

Caramelization of the whey and similar milk-solids-not-fat must ordinarily be carried out at temperatures, concentrations and pressures substantially different from pasteurization or flash pasteurization. It has been found that pasteurization or flash pasteurization ordinarily will not caramelize or result in sufficient caramelization for the products to be utilized in the present procedures.

Ordinary methods of concentration or evaporation of milk do not give the most satisfactory results because of the difference in concentration of the milk-solids-not-fat in the milk and it is always desirable first to concentrate the milk-solids-not-fat before the caramelization procedure is permitted to take place.

Although it is generally not preferred to use the caramelized whey or other milk-solids-not-fat with or without dehydration and concentration for addition to substantially pure glyceride oils and fats, a certain antioxygenic effect may be obtained by adding completely dried caramelized whey or other completely dried milk-solids-not-fat to the oil in amounts varying, for example, from 0.5% to 5% with thorough dispersion and agitation, followed where desired by heating to a slightly elevated temperature such as to between about 150° F. and 200° F. and then removing the undissolved solids by filtration or centrifuging. Among the glyceride oils and fats which may be treated in this manner are included particularly the vegetable oils such as cottonseed oil, corn oil, soya bean oil, peanut oil, sesame oil, olive oil, etc., preferably in substantially deodorized or odorless condition and also the hydrogenated oils such as hydrogenated cottonseed oil, hydrogenated corn oil, etc., which are also in substantially deodorized or odorless condition.

Not only is a stabilizing effect obtained when the caramelized milk solids in substantially dried condition, and which milk solids have been caramelized in aqueous condition and subsequently dehydrated, are added to a glyceride oil, but in addition a highly desirable flavor is obtained.

Under these conditions, it is not desirable to use the uncaramelized milk solids such as a skim milk, whey or buttermilk but only in substantially caramelized condition and when these milk solids are added to the oil, the milk solids should be in substantially dried or dehydrated condition containing less than 20% moisture and preferably less than 10% total moisture, as often when there are excessive amounts of water, the oil does not tend to become more stable, but rather tends to become more subject to the development of oxidative deterioration and to rancidity.

The caramelized whey or other caramelized milk-solids-not-fat may be similarly utilized in stabilizing other oils against oxidative deterioration such as in stabilizing the essential oils including orange oil, lemon oil and the various perfume oils and also the hydrocarbon oils and hydrocarbon distillates including lubricating oils, mineral oils, gasoline, etc. Under these circumstances, the caramelized whey or other caramelized milk solids are added in substantially dehydrated or dried condition to the oil, such as to the lubricating oil, in a relatively small amount and thoroughly dispersed therein.

From 1 to 4 parts of the oil, such as of the lubricating oil, may be mixed with 1 part of caramelized whey or other caramelized milk solids and then preferably subjected to an elevated temperature of between about 200° F. and 350° F., followed by removal of the substantially insoluble whey solids which may become charred in the lubricating oil during the extraction procedure. The lubricating oil containing the dissolved substantially caramelized whey solids may then be added to a larger quantity of the lubricating oil in order to stabilize said lubricating oil against oxidation and particularly against corrosion where the lubricating oil is used in contact with metallic surfaces.

It is possible to replace part or all of the caramelized whey or caramelized milk-solids-not-fat by caramelized, finely divided, hydrolyzed or non-hydrolyzed soya beans, peanuts, cottonseed, sesame seed, wheat germ, corn germ, rice bran, rice polish, cocoa flour, cacao shells, which products may be either in deoiled condition or with their full normal oil content.

These materials either by themselves or containing from 10% to 60% of whey may be heated to temperatures of 210° F. to 220° F. and preferably 230° F. to 250° F. in order to caramelize them.

For example, soya flour, peanut flour or cottonseed flour in aqueous dispersion, with or without caramelized or non-caramelized whey or other milk-solids-not-fat, may be heated to over 200° F. and preferably to about 250° F. for 30 minutes, the heating being done following acidification of the flour in aqueous condition to a pH of between 4 and 6.8 and preferably at a pH of about 5 to 5.5.

Where soya flour is caramelized by heating to 250° F. for 30 minutes in 5 parts of water at a pH of 5.5, following which the pH is adjusted to about 6.5 and the soya flour concentrated or dried, the resultant flour has an enhanced antioxygenic and stabilizing effect.

The present application is a continuation in part of application Serial No. 239,319, filed November 7, 1938, now Patent No. 2,198,215; application Serial No. 237,466 filed October 28, 1938, now Patent No. 2,198,216; application Serial No. 285,354 filed July 19, 1939, now Patent No. 2,198,217 and through these applications of application Serial No. 228,454 filed September 3, 1938, now Patent No. 2,176,023.

Having described my invention, what I claim is:

1. The process of stabilizing a glyceride oil containing composition which comprises adding thereto a relatively small proportion of caramelized milk-solids-not-fat.

2. The process of producing a stabilized glyceride oil which comprises adding thereto and thoroughly admixing therewith a relatively small proportion of dried caramelized milk-solids-not-fat, and then removing the undissolved milk-solids-not-fat.

3. The process of producing a stabilized organic oil which comprises adding thereto and thoroughly admixing therewith a relatively small proportion of dried caramelized milk-solids-not-fat, and then removing the undissolved milk-solids-not-fat.

4. The process of producing a stabilized glyceride oil which comprises adding a relatively small proportion of caramelized milk-solids-not-fat to the aqueous phase of a glyceride oil dispersion, thoroughly admixing the milk-solids-not-fat therewith, and then removing the glyceride oil which will be in substantially stabilized condition.

5. The process of stabilizing aqueous glyceride oil containing compositions which comprises adding thereto a relatively small proportion of caramelized milk-solids-not-fat.

6. The process of stabilizing a glyceride oil containing aqueous dairy product which comprises adding thereto a relatively small proportion of caramelized milk-solids-not-fat.

7. The process of stabilizing ice cream which comprises adding thereto a relatively small proportion of caramelized milk-solids-not-fat.

8. The process of producing a stabilized butter which comprises adding a relatively small proportion of caramelized milk-solids-not-fat to cream, thoroughly admixing the milk-solids-not-fat therewith, churning to form butter and removing the buttermilk containing the caramelized milk-solids-not-fat from the butter.

SIDNEY MUSHER.